United States Patent [19]
Pei

[11] 3,952,724
[45] Apr. 27, 1976

[54] SOLAR ENERGY CONVERTER

[75] Inventor: Yu K. Pei, Toledo, Ohio

[73] Assignee: Owens-Illinois, Inc., Toledo, Ohio

[22] Filed: June 24, 1974

[21] Appl. No.: 482,092

[52] U.S. Cl. ............................. 126/271; 138/113; 165/142; 215/13 R; 285/47; 285/133 R; 237/1 A
[51] Int. Cl.² ......................................... F24J 3/02
[58] Field of Search ............ 126/270, 271; 165/142; 138/113, 114; 285/47, 133 R; 215/13 R; 237/1 A

[56] References Cited
UNITED STATES PATENTS

| | | | |
|---|---|---|---|
| 980,505 | 1/1911 | Emmet | 126/271 |
| 1,663,032 | 3/1928 | Wetmore | 215/13 R |
| 2,205,378 | 6/1940 | Abbot | 126/271 |
| 2,243,593 | 5/1941 | Zallea | 165/142 |
| 2,247,830 | 7/1941 | Abbot | 126/271 |
| 2,460,482 | 2/1949 | Abbot | 126/271 |
| 2,872,915 | 2/1959 | Bowen | 126/271 |
| 2,917,817 | 12/1959 | Tabor | 126/270 X |
| 3,227,153 | 1/1966 | Godel et al. | 126/271 |

Primary Examiner—Kenneth W. Sprague
Assistant Examiner—James C. Yeung
Attorney, Agent, or Firm—J. R. Nelson

[57] ABSTRACT

The disclosed invention relates to a solar energy collector in a conversion system. The collector is made from common glass tubing lengths of different diameters and comprises a first outer clear glass cylindrical tube having approximately a semi-cylinder surface portion mirror coated for reflection and a collector tube inside the first tube having an energy absorbing coating on its exterior surface. The tubes resemble over-sized test tubes in that one end is closed. The collector is held in place inside the outer tube by a spacer-support element snapped on the closed end of the collector. The open end of the outer tube is sealed to the wall of the collector, and the space is evacuated. An open-ended fluid handling tube of glass is inserted into the collector tube and has a spiral or helical baffle along its length to guide working fluid issuing into the collector near its closed end along the wall thereof and absorb collected heat. Several of the energy collectors are detachably connected into a manifold for circulation of working fluid (air or water or the like) into the handling tube and receive working fluid flowing from the collector tube. The manifold provides for collector tubes to depend on opposite sides as a module covering predetermined area of rooftop or like solar exposure. The working fluid carrying the energy is utilized in a heating or cooling system.

18 Claims, 6 Drawing Figures

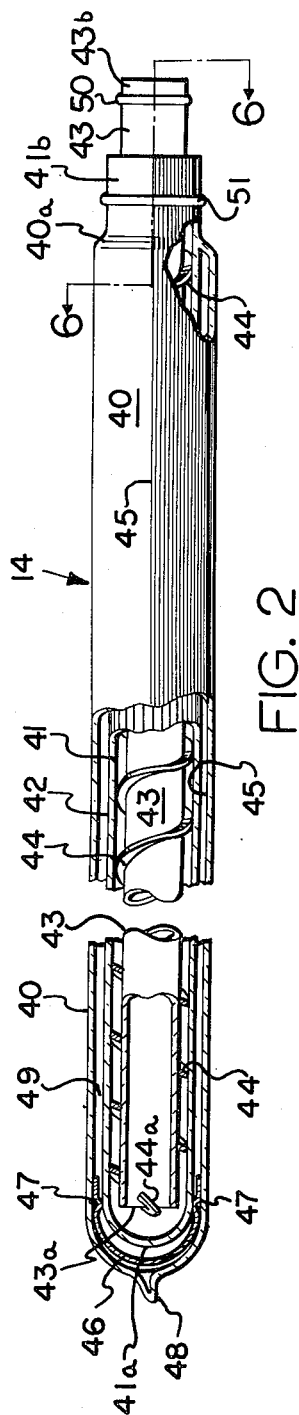
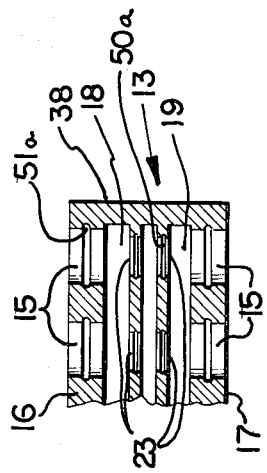
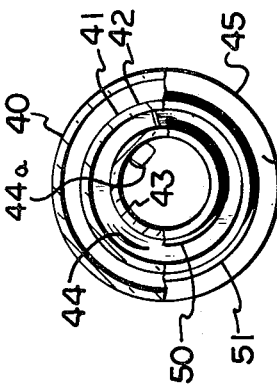
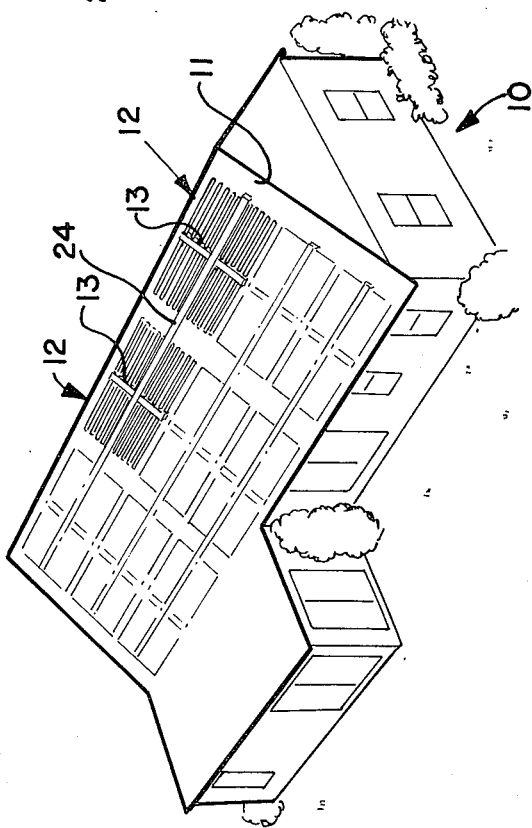

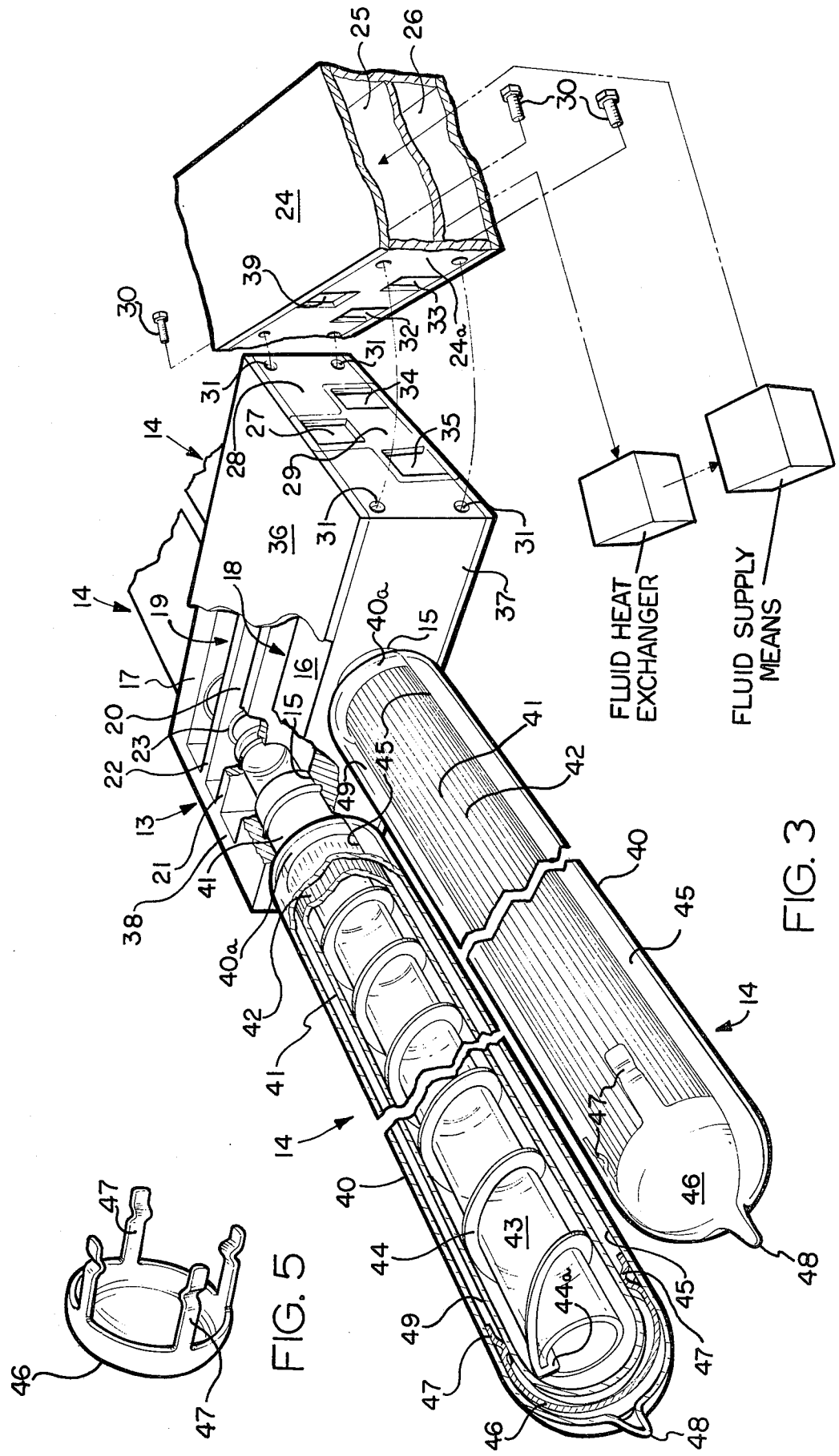

SOLAR ENERGY CONVERTER

The present invention relates to solar energy collectors. More specifically, the invention provides a relatively inexpensive and efficient unit for installation as a module or unit in a solar energy converter system.

SUMMARY OF THE INVENTION

The basic components of the energy collector unit for the system are made of glass of known tubular manufacture such as are prevalent today in the manufacture of glass tubing products, e.g. flourescent lighting tubing, or the like.

The tubular glass solar energy collectors are assembled onto a manifold such that the tubular collectors are detachably connected into a manifold. The manifold may be constructed for disposition of the collectors on either side thereof so as to extend laterally in rows along the manifold and provide an energy collecting system connected for either cooling or heating uses.

OBJECTS OF THE INVENTION

One of the important objects of the present invention is to provide a collector unit of low cost of manufacture and of operation. The collector unit may be mass produced of relatively inexpensive raw materials, the bulk of which is glass, and may be maintained in use or replaced easily.

Another important feature of the invention is the construction of the collector wherein the components comprised of three concentric tubes are made of glass. The two outermost tubes are constructed from glass tubing to resemble oversized test tubes in that their one end is closed. The outer tube is sealed to the intermediate inner tube and the space therebetween evacuated to a practical and efficient degree of vacuum to prevent heat loss through the space by convection and conduction heat loss. The intermediate inner tube is coated with an energy absorbing coating of high absorptivity and low emissivity. The third tube is placed inside the intermediate tube and is used to carry the fluid medium to the interior, closed end of the latter. The parts thus described, aside from the coatings, are of the same or similar composition of glass. The thermal expansion characteristics are similar and are less than metals normally used in this type of a collector heretofore; thereby avoiding failure from thermal expansion differences during operation. Additionally, the glass parts may be sealed one to the other more readily and with less cost in manufacture.

Another important object of the invention is to provide a spiral baffle between the interior wall surface of the intermediate tube and the outer wall surface of the fluid carrying tube to channel the fluid medium through the collector in a regulated manner so as to obtain maximum exposure of the fluid medium to the wall of the energy absorber tube and thereby enhance the efficiency of the heat exchange between the absorber-collector surface and the circulated fluid medium. The baffle terminates near the outlet for the fluid.

A further object of the invention is to provide a manifold for the fluid medium flow into and out of a plurality of the collector units connected thereto, and the collector units are provided with a quick disconnect and O-ring seal in a socket of the manifold for each collector unit.

Another object of the invention is to provide a snap-on support means connected to the interior end of the coated, intermediate tube holding that end of the tube in concentric position in the outer tube, the other end of the outer tube being sealed to the intermediate tube for support.

Other objects and advantages will become apparent from the following description in conjunction with the accompanying drawings.

BRIEF DESCRIPTION OF THE DRAWINGS

FIG. 1 is a perspective view showing the invention in use on the roof slope of a dwelling.

FIG. 2 is a side view, partly broken away and in section, of collector unit of the invention.

FIG. 3 is an exploded, perspective view, partly broken away and in section, showing a solar energy converter system module of the double manifold embodiment, wherein collector units depend on either side of the manifold.

FIG. 4 is a sectional plan view of a portion of the manifold of FIG. 3.

FIG. 5 is a perspective view of the end cap providing an inner end support means for the coated absorber tube of the collector inside the outer jacket tube.

FIG. 6 is a staggered sectional end view of the collector taken along line 6—6 on FIG. 2.

DESCRIPTION

Shown on FIG. 1 is a typical in-use setting for the invention. The dwelling 10, such as a residence, has its roof section 11 located nearest the sun or most accessible to the sun, provided with plural modules 12 of the solar energy converter of the invention. The area selected for coverage by modules 12 may be left to the skill of the engineer and architect providing for the heating or cooling for the dwelling.

THE MANIFOLD

The module of the solar energy converter is shown in detail on FIG. 3. Module 12 which appears in part on the exploded view, comprises a central longitudinal manifold section 13 that extends down the roof section (FIG. 1). Depending outwardly from either side of the manifold 13 are plural collector units 14, to be presently described. The collectors 14 are of a plug-in type of connection into the side ports 15 spaced along the opposite vertical side walls 16 and 17 of manifold 13. Internally of manifold 13 are longitudinal passageways 18 and 19 running along the ports 15 on either side of the manifold. Sandwiched between passageways 18 and 19 is a central passageway 20 defined by the longitudinal interior vertical walls 21 and 22. Along walls 21 and 22 there are spaced apart ports 23. The ports 15 and 23 are matched as sets on the same central axis, i.e., the ports are coaxial.

The manifold 13 connects into a fluid handling system illustrated by the duct 24 having an upper conduit passage 25 and a lower conduit passage 26. The duct 24 extends between the heating or cooling system (labelled "Fluid Heat Exchanger" on FIG. 3) and the solar converter module 12. The passage 25 carries the relatively cool fluid medium, such as water, air or the like, and introduces it through the matching aperture connection 39 in the vertical wall 24a of duct 24 and aperture 27 in the vertical end wall 28 of manifold 13. The aperture 27 connects into the central passageway 20 of manifold 13. The duct 24 and manifold 13 are connected and sealed together by the gasketed facing 29 held by cap screws 30 threaded into end wall 28 at 31. Gasket 29 may be any suitable compressible gasket material that will withstand moderately elevated temperature service. Matching lower apertures 32 and 33 in wall 24a and 34 and 35 in wall 28 connect the respective passages 18 and 19 with the duct passage 26 for carrying the heated fluid medium coming from the collectors 14.

Manifold 13 is enclosed by top and bottom walls 36 and 37, respectively, and at its outer end by vertical wall 38.

THE COLLECTOR UNIT

Collectors 14 are all constructed alike, and each comprises an outer glass tube 40 that is of convenient length, say from 4 to 7 feet and of standard diameter similar to a flourescent light tube, e.g. 2 inches O.D. Approximately a semi-cylindrical one-half of the interior surface of tube 40 on the lower region on FIGS. 2 and 3 is coated with a reflecting material 45, such as by silvering that surface area in the manner well known in the art of producing glass mirrors. This lower mirrored surface 45 will reflect radiant energy onto the absorber tube 41 of the collector.

The interior tube 41 is made of glass and is of somewhat lesser diameter and of slightly greater length. Tube 41 has its exterior surface precoated with an energy absorbing coating 42 having a very high absorptivity and very low emissivity. Examples of such coating materials are black chrome, nickel, lampblack, carbon or copper compounded for suitable application, such as by painting the compound on the exterior surface of tube 41 and to the axial extent shown on FIG. 3.

Inside tube 41 there is a fluid delivery glass tube 43 for conveying relatively cool fluid medium into the collector interiorly of tube 41 and adjacent the closed end wall 41a thereof. The inner end 43a of delivery tube 43 is open (FIG. 2). Along the length of delivery tube 43 is a spiral or helical baffle member 44 that is hooked at the end edge 43a at the slotted portion 44a and spirally wrapped on edge along the length of the outer wall of tube 43. The helical baffle may be constructed of a metallic material or plastic material, the latter being selected from plastic materials that will withstand temperatures in the 250°–300° F range. One example of such a plastic is "teflon" made and sold by duPont, the chemical designation being tetra flouro ethylene. The baffle helix 44 provides two primary functions: (1) It serves to maintain the delivery tube 43 outer wall surface 43 spaced from the inner wall surface of coated absorber tube 41 and provide a flow passage for fluid introduced by delivery tube 43; and (2) It distributes the fluid and provides a washing contact of the fluid over the entire inner wall surface of absorber tube 41 to enhance efficiency of heat exchange from the absorber to the fluid medium.

In assembly, the absorbing tube 41 already coated on the exterior with the energy absorbing compound at 42, is further provided with the snap-on end support cap 46 (FIG. 5) which provides inner end support means for tube 41 in tube 40. Cap 46 comprises a semispherical shell and multiple (either 3 or 4) legs 47. The cap 46 is made of metal or plastic having some resiliency to maintain its force fit on the inner end of tube 41. Tube 41 is then inserted into the outer tube 40 and is fastened by fusing its open end onto tube 41 at the juncture 40a (FIG. 2). Thereafter, a vacuum is pulled through the opposite end of tube 40 and sealed off at the tip 48 in the manner known to those skilled in the art, the resultant sealed space 49 between the outer tube 40 and absorber tube 41 being highly evacuated; viz on the order of $10^{-4}$ torr of vacuum. Next the delivery tube and baffle helix 44 thereon are inserted interiorly of the absorber tube 41.

Each of the collector units 14 is detachably assembled into the manifold 13 as follows. The free end 43b of the delivery tube 43 is approximately the same O.D. as the diameter of the ports 23 in the interior walls 20 and 21 of the manifold. A rubber O-ring 50 is provided on free end 43b of the delivery tube to seal the latter in port 23. Similarly free end 41b of the absorber tube is approximately the same O.D. as the port 15 in either of vertical side walls 16 or 17. A rubber-O-ring 51 is provided on free end 41b of the absorber tube to seal it in port 15. The ports 15 and 23 are each provided with recess grooves 51a and 50a respectively, to receive the gasket O-rings 51 and 50 therein.

OPERATION OF THE COLLECTOR MODULE

Utilizing the assembly shown on FIG. 3, and described earlier herein, a fluid medium, for example air, is pumped in duct 25 into central passage 20 of the manifold. The free ends 43b of the several collectors 14 communicate with passage 20 and are sealed therein so that the air flows lengthwise of the delivery tube 43 and exits at inner end 43a. Solar rays penetrate the upper glass of tube 40 and energy therefrom is absorbed by coating 42 of the absorber tube 41. Solar energy that passes tube 41 tangentially or beyond is reflected by the mirror coating on the inner surface of the lower one-half of tube 40 and is absorbed by coating 42 on tube 41. The air circulated on the interior of tube 41 traverses the passage defined by helical baffle 44 and heat exchange therewith increases the temperature of the air as it travels toward the free end 41b of tube 41.

When heated air reaches the free end 41b of the tube connected thereat into either passageway 18 or 19, as the case may be, the heated fluid media flows by gravity or power, depending upon the system, into the lower duct 26 and it utilized to either heat or cool the dwelling 10.

One of the significant advantages of the system is experienced in the collector units 14 of the invention. Should any one of the collectors 14 be damaged, break or malfunction, a replacement may be readily inserted and the defective unit removed, thereby maintaining the efficiency of the system.

The glass tubes of the unit are fabricated from known and standard glass shapes of either a soda-lime glass composition or a borosilicate glass composition. Both glasses are relatively inexpensive. The balance of the parts of collector 14 may be readily made from plastics by known molding techniques and at a relatively low cost. The system and modules thereof may be assembled on the site of installation and need not be prefabricated at the factory and delivered to the site. The solar energy collector of this invention is simple to manufacture and assemble. Furthermore, it is lightweight; therefore, there is no need to further structure or reinforce the roof of the building where it is installed.

In use of the invention, the working fluid is deliverable from the collectors at a temperature in excess of 250° F. The energy absorbing coating 42 is totally protected and will last the lifetime of usage of the collector unit.

The module concept illustrated herein includes the preferred embodiment whereby collectors depend on both sides of the manifold — a "double acting" system. It is also within the scope of the invention to fabricate a "single acting" system wherein collectors depend only along the one side of the manifold. This may have some specialized uses, but, as stated, the double acting system is the preferred embodiment.

Other and further modifications may be resorted to without departing from the spirit and scope of the appended claims.

What is claimed:

1. A solar energy collector apparatus comprising an outer hollow, elongated tubular member of transparent glass, closed at its one end and normally open at its other end, a hollow, elongated tubular glass absorber member defining a glass wall of lesser O.D. than the I.D. of said outer member which is closed at its one end and open at its other end, the absorber member having its exterior surface comprised of an energy absorbing coating applied thereon over a substantial portion of its axial length, said coating having high absorptivity and low emissivity, said absorber member being inserted within said outer member such that the other open end of the absorber member projects out of the other normally open end of said outer member, spring-like, snap on means engaging said closed end of the absorber member supporting it in spaced relation to the interior surface of said outer member near the closed end of the latter, an annular portion of the glass at the other normally open end of said outer member being fused annularly onto the glass wall of the absorber member, thereby sealing it to said absorber member near its other end and closing the space therebetween, said space being evacuated, a fluid handling member of lesser O.D. than the I.D. of said absorber member positioned within the latter, said fluid handling member extending substantially the length of the absorber member and the inner end thereof being open and communicating with the hollow interior of said absorber member and providing a space between the latter two members for circulation of fluid medium, a fluid media supply means, means connecting the supply means to the fluid handling member, and separate fluid conduit means connected to the other open end of said absorber member to receive fluid media flowing therefrom, the fluid media flowing between said fluid handling member and said absorber member in heat exchange relation with the energy absorbing surface of said absorber member.

2. The solar energy apparatus of claim 1, including a mirror surface on a portion of the periphery of the outer tubular member of transparent material, said mirror surface covering no more than one-half the surface area of said outer tubular member.

3. The solar energy apparatus of claim 1, wherein said fluid handling member is comprised of a length of hollow, cylindrical glass tubing.

4. The solar energy apparatus of claim 1, wherein said outer member and said fluid handling member are each constructed of drawn, cylindrical glass tubing and said absorber member is constructed of cylindrical glass tubing having an opague coating of said energy absorbing compound encircling the exterior surface thereof and said coating is contained within said evacuated space.

5. The solar energy apparatus of claim 4, wherein the said energy absorbing coating is a compound selected from the group consisting of black chrome, nickel, lamp black, carbon and copper compounds.

6. The solary energy apparatus of claim 1, including a spiral baffle means generated about the exterior peripheral surface of the fluid handling member and engaging the interior wall surface of the absorber member thereby defining a spiral flow passage along the space between the fluid handling member and the absorber member, said baffle means comprising a strip of plastic material wound spirally around the exterior of the cylindrical fluid handling member from its innermost end to adjacent the other open end of said absorber member.

7. The solar energy apparatus of claim 1, wherein said means connecting the fluid supply means to said fluid handling member and the conduit means to receive fluid media from said absorber member comprises a manifold having plural passageways therein, one of said passageways conducting fluid media from said source, first detachable connecting means for sealingly connecting the outer end of said fluid handling member to said one passagway thereby conducting media through the fluid handling member, and second detachable connecting means, coaxial with said first connecting means, for sealingly connecting the outer open end of said absorber member to a second of said plural passageways, the latter conducting fluid media from said absorber member.

8. The solar energy apparatus of claim 7, wherein the first and second detachable connecting means comprises first and second resilient annularly compressible members coaxially supported in aligned apertures in the manifold respectively communicating with the first and second passageways thereof, the first resilient member providing an annular, yielding interference fit with the outer end of the fluid handling member for sealingly connecting it with said one passageway of the manifold, and the second resilient member providing an annular, yielding interference fit with the outer open end of the absorber member for sealingly connecting it with the second passageway of the manifold.

9. The solar energy apparatus of claim 8, wherein the first and second resilient annularly compressible members each comprise a rubber O-ring retained in an encircling relation to the respective aligned apertures of the manifold.

10. The solar energy apparatus of claim 1, wherein the spring-like, snap-on means engaging the one closed end of the absorber member comprises a cap element having plural outwardly dependent resilient legs, said legs frictionally engaging said absorber member adjacent its closed end and said cap element nestingly engaging the closed one end of said outer tubular member, thereby holding the innermost closed end of said absorber member in spaced relationship to the interior of said outer member.

11. A solar energy collector apparatus comprising a first elongated, hollow transparent cylindrical glass tube having its one end closed and the other end open, a second elongated, hollow transparent cylindrical glass tube having its one end closed and the other end open, and disposed within said first tube, the glass composition of both said glass tubes being substantially the same, a surface coating of energy absorbing material on the exterior surface area of said second tube, said coating having high absorptivity and low emissivity, means on the closed end of said second tube holding the second tube in spaced relationship to the first tube defining a space therebetween, means sealing the other open end of the first tube onto the exterior of the second tube, said means comprising a fusion of an encircling, annular portion of the glass at the open end of the first tube onto the second tube enclosing a space therebetween, said space being evacuated, a source of working fluid, means for introducing working fluid internally of the second tube in heat exchange relationship with the surface area of said second tube, and means connected to the other open end of said second tube for conducting solar energy laden working fluid away from the collector apparatus.

12. The solar energy collector apparatus of claim 11, wherein the first and second glass tubes are formed from drawn single glass tubing that is comprised of a glass composition selected from the group of glasses consisting of soda-lime and borosilicate glasses.

13. The solar energy collector apparatus of claim 11, wherein the surface coating of the energy absorbing material applied onto the exterior surface area of the second tube is opaque and contained within said evacuated space, the said energy absorbing material of said coating being selected from the group consisting of black chrome, nickel, lampblack, carbon and copper compounds.

14. The solar energy collector apparatus of claim 11, wherein the means holding the second tube in spaced relation to the first tube comprises a cup-like element of heat resistant material nestable in the closed end area of said first tube and having plural, integral, dependent spring-like legs of some resilience for frictionally engaging the end portion of said second tube.

15. The solar energy collector apparatus of claim 11, wherein said means for introducing the working fluid internally of the second tube comprises an elongated hollow glass delivery tube inserted within said second tube, the innermost end of the former being spaced and in the proximity of the closed end of the latter, and means connecting the opposite outer end of the delivery tube to the working fluid source, whereby working fluid is introduced into said second tube near its closed end and circulated substantially the axial length thereof and along the interior surface of the second tube.

16. The solar energy collector apparatus of claim 15, wherein the means connecting the working fluid source to the delivery tube and means connecting the open end of the second tube for conducting working fluid away from the collector comprises a manifold having separated inlet and outlet passages and means for individually detachably connecting the delivery tube and second tube, respectively, to said passages.

17. A solar energy module comprising elongated, plural energy collectors each having coaxial fluid delivery and energy collector tubes, an elongated manifold comprised of a wall structure defining a longitudinal inlet passage and a separate parallel longitudinal outlet passage, means for detachably connecting each of the collectors to said manifold for circulation of working fluid through the collectors in heat exchange relation therewith comprising a pair of coaxial ports corresponding to a collector of said plurality, one port disposed in the walls of said manifold adjacent its inlet passage for connecting said delivery tube and the second port disposed in coaxial alignment with the first port disposed in the wall of said manifold adjacent said outlet passage and spaced from said inlet passage, and sealing means cooperating respectively between the delivery tube and the inlet port wall and between the energy collector tube and the outlet port wall for readily detachably connecting each of said energy collectors to the manifold, said sealing means comprising annular grooves in the wall of the manifold peripherally encircling each of said coaxial ports and compressible O-rings of fluid sealing material retained in each said groove and compressed respectively between the wall port and the delivery tube and the wall port and the energy collector.

18. The solar energy module of claim 17, wherein the manifold is elongated and includes a longitudinal central inlet passage connected to each of said fluid delivery tubes at said one port of said coaxial ports and two parallel longitudinal outlet passages on opposite sides of the inlet passage, said collectors being connected to said passages so as to project laterally on opposite sides of the manifold, each of the two outlet passages being connected to the energy collector tubes of the collectors projecting adjacent thereto at said second port in the exterior wall of the respective longitudinal passages, whereby each of the several energy collectors are frictionally and detachably connected by said O-rings into the central inlet passage and one of the two outlet passages, respectively, for heat exchange operation.

* * * * *